April 24, 1928.
J. H. HAMMOND, JR
1,666,897
SHIP GUIDANCE SYSTEM
Filed April 27, 1922
2 Sheets-Sheet 1
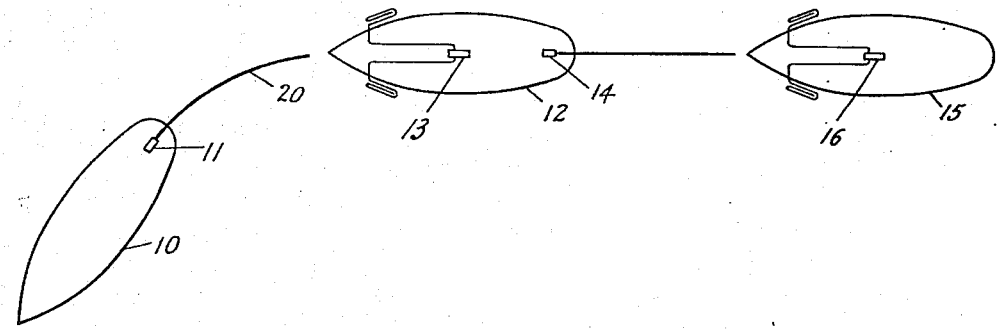
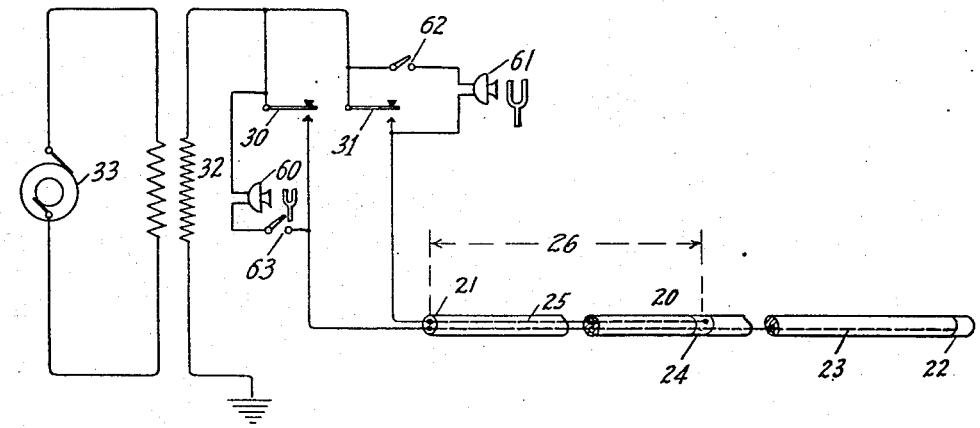
Inventor
John Hays Hammond, Jr.
By his Attorney
A. D. Gardner April 24, 1928.
J. H. HAMMOND, JR
1,666,897
SHIP GUIDANCE SYSTEM
Filed April 27, 1922    2 Sheets-Sheet 2
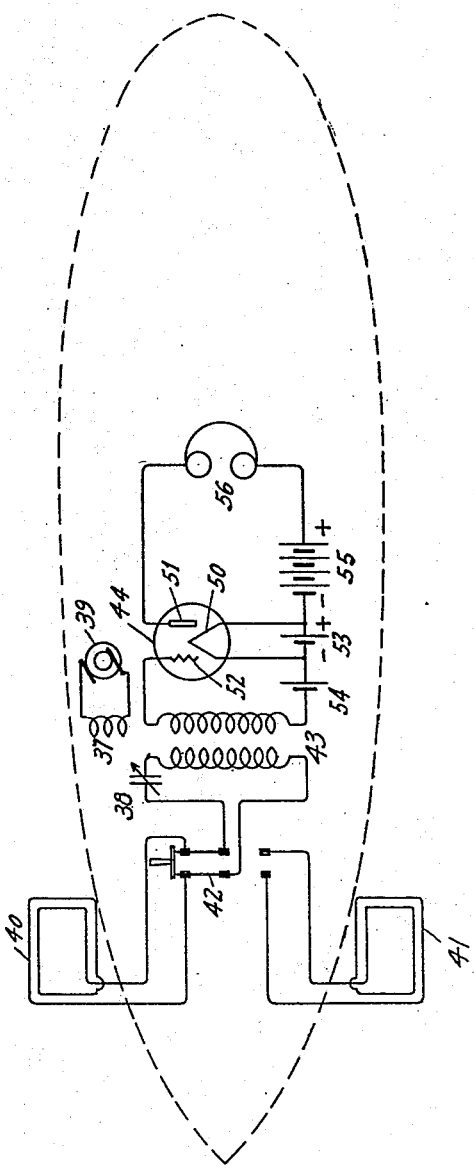
Inventor
John Hays Hammond, Jr.
By his Attorney Patented Apr. 24, 1928.

1,666,897

UNITED STATES PATENT OFFICE.

JOHN HAYS HAMMOND, JR., OF GLOUCESTER, MASSACHUSETTS.

SHIP-GUIDANCE SYSTEM.

Application filed April 27, 1922. Serial No. 556,846.

This invention relates to systems of signalling by radiant energy and more particularly to systems for indicating the relative positions of movable bodies whereby desired relative positions may be maintained; to provide means for maintaining such positions independent of fog or darkness; to indicate variations in speed of a leading body so that the speed of the following body may be adjusted accordingly; to provide signalling currents having a plurality of characteristics each indicating a variation in a different spacing of the bodies; and to provide other objects as will appear from the following description taken in connection with the accompanying drawings.

Referring to the drawings, Figure 1 shows a plurality of vessels in single file; Figure 2 shows the radiant energy transmitting means; and Figure 3 shows the radiant energy responsive means.

Referring to Figure 1, there is represented a series of movable bodies comprising an indeterminate number of vessels in single file. As shown three vessels are illustrated, a leading vessel 10 being provided with means for transmitting radiant energy positioned as indicated at 11, an intermediate vessel such as 12 being provided with means 13 responsive to the radiant energy emitted by the transmitter positioned as indicated at 11 and also with a transmitter positioned as indicated at 14 corresponding to the transmitter shown at 11, and rearmost vessel 15 provided with means 16 responsive to the radiant energy emitted by the transmitter of the next forward vessel such as 12.

Each transmitter for transmitting the radiant energy comprises a trailer 20 (see Fig. 2) which may consist of a flexible electric cable suitably insulated and protected by a sheath which may be a metallic conductor. The forward end 21 is suitably secured to an appropriate cable terminal (not shown) on the respective vessel, and the remainder of the cable is thrown overboard to float in the water. The specific gravity of the cable is preferably substantially equal to that of the water, suitable means, such as floats of definite buoyancy being provided thereon in a well known manner for maintaining said remaining portion in the water at a predetermined depth. The free end of the cable 20 is provided with a grounding sleeve 22 to which is connected an insulated conductor 23 extending the length of the cable. Substantially midway of the length of the cable is a second grounding sleeve 24 to which is connected a second insulated conductor 25 extending only from the sleeve 24 to the ship. The intermediate sleeve 24 is positioned at a predetermined distance from the ship from which it is trailed, this distance corresponding to the minimum desired spacing of an adjacent pair of ships of the train. The outer sleeve 22 is spaced apart from the ships by the length of the cable 20, this being equivalent to the maximum desired spacing of an adjacent pair of ships. Thus the zone 26, extending from the sleeve 24 to the vessel end 21 of the cable comprises the danger zone which it is desired that the next successive vessel of the train of vessels indicated in Figure 1 shall not enter.

For selectively connecting into circuit the conductors 23 and 25 respectively, there are provided circuit closers such as contact springs 30 and 31. Closure of either of these keys connects the respective conductor to the secondary of a transformer 32, inductively coupled to the circuit of a source of audio-frequency alternating current 33. One pole of the secondary winding of the transformer 32 is grounded to the frame of the ship.

Generator 33 may generate radio frequency current, in which case, microphones 60 and 61, or any other modulating device, may be used in place of keys 30 and 31.

For receiving radiant energy on the trailing vessel, there is provided on each a pair of receiving loops 40 and 41 symmetrically positioned on the right (starboard) and left (port) sides of the vessel respectively. These loops each consist of conductors, preferably insulated, wound in a continuous loop around a supporting frame of suitable size. The two loops of a vessel have the same structural characteristics, such as size, number of turns and size of wire, so that they have similar magnetic and electrical characteristics. The loops may be alternately connected into circuit by means of a double throw switch as by a knife switch 42 of conventional design. The blades of the switch are connected to the terminals of the primary winding of a transformer 43 through a variable condenser 38. The secondary winding of this transformer is connected in the aperiodic grid circuit of a three element thermionic device 44.

The thermionic device 44 comprises a usual vacuum tube or audion, having a filament 50, forming a hot cathode for emitting electrons, a plate 51 upon which the electrons impinge and a grid 52 for controlling the flow of electrons. A battery 53 is provided for heating the filament. A battery 54 may be provided in the circuit of the grid 52 for maintaining the normal potential of the grid element different from that of the negative end of the filament by a predetermined amount. The voltage of this battery determines the point on the characteristic curve of the device at which the tube shall be operated. For audio-frequency reception tube 44 is used as an amplifier. For radio frequency reception battery 54 is adjusted so that the tube functions as a detector. A plate battery 55 maintains a potential between the plate 51 and the negative end of the filament to render the plate 51 an anode with respect thereto. An indicating device, such as a receiver 56 is provided in the plate circuit, responsive to oscillations therein. In order to render audible in the telephones 56, signals of radio frequencies, when not modulated by microphones 60 and 61 but interrupted by keys 30 and 31 a source of variable radio frequency is shown at 39 connected to an inducing coil 37, which is in inductive relation to transformer 43, thus forming the well known heterodyne receiver. The frequency of the source 39 is adjusted so as to differ from that of the incoming signal by an amount of say 1,000 cycles, thus audible beats will be heard in the telephones 56.

In operation, each transmitter is operated either automatically, as by a clockwork mechanism, or continually in a well known manner manually by a member of the crew of its respective ship, while each receiving device is attended by a member of the crew of its ship. The transmitting and receiving stations are operated in pairs, a transmitter of one ship and the receiver of the next following ship forming a pair, and since the several pairs of a train of ships are identical in operation, a description of the operation of one such pair will suffice for all.

The generator 33 may be driven in any appropriate manner and supplies power to transformer 21. Assuming that audio frequency signaling is desired and that first key 30 is closed, a current will flow in the circuit; frame of the ship, secondary winding of the transformer 32 in which an alternating current is induced, key 30 conductor 23, sleeve 22, the return being through the body of water in which the ship and trailer 20 floats. As the result of this flow of current, there will be set up an alternating magnetic field around the entire cable trailer 20. The lines of force of this alternating magnetic field cut the coils of the receiving loops of the next following ship. Assuming that the switch 42 is in the position shown in Figure 3, so that the coil 40 is in circuit an alternating current will be induced in the circuit; loop 40, blades of switch 42, through condenser 38, which is varied for loudest signal, of the transformer 43. A secondary current of the same frequency is induced in the other winding of this transformer, and this current alternately increases and decreases the normal grid potential of the device 44. Impulses corresponding thereto, but of greatly amplified value flow in the plate circuit and through the indicating receiver 56, producing a tone therein.

The operator who is listening to the signals now throws the switch 42 to its opposite closed position. This makes the other loop 41 effective in the same manner, and a tone is again produced in the receiver 56.

If the following ship is directly above the cable 20, the intensity of the received signal will be substantially the same in the two positions of the switch 42, since the loops 40 and 41 are equi-distant from the cable. If, however, the course of the ship has been diverted, the loops 40 and 41 are not equi-distant from the cable, then the signal from the loop nearer the cable is the louder. The course of the vessel may then be diverted towards the cable until sounds of the same intensity are again received in both positions of the switch 42. When the guiding ship's course is changed the action is the same as if the course of the following ship has been diverted, and the following vessel is steered until sounds of the same intensity are heard. Thus the course of the following vessel will correspond to that of the leading vessel.

Should the spacing of the vessels be increased, as by acceleration of the guiding vessel or by de-acceleration of the following vessel, so that the distance between the loops 40 and 41 and the free end of the preceding cable is increased, the signal will become weaker, in both positions of the switch 42. The operator will then issue instructions to have the speed of the vessel increased.

Should the spacing of the vessels be decreased as by de-acceleration of the guiding vessel or acceleration of the following vessel, the signals produced upon closure of the key 31 will be detected. These signals are caused by a current in the circuit; frame of the ship, secondary winding of the transformers 32 in which an alternating current is induced, key 31, conductor 25, sleeve 24, the return being through the body of water. Thus an alternating magnetic field is set up around that portion of the cable between the guiding vessel and the sleeve 24 (zone 26, Fig. 2). The lines of force of this alternating magnetic field cut the coils of the receiving loops whenever the key 31 and switch 42 are closed. The circuit controlled by key 31 radiates a signal whose characteristic differs from that circuit which key 30 controls, either electrically, in time element or both. For example, the current controlled by key 30 may be continuous and that by key 31 intermittent; or that controlled by key 30 may be interrupted to send dots every half second, and that by key 31, say, ten dots per second; or, one current may be modulated by a voice current corresponding to the sentence "You are getting too near" and the other may be unmodulated; or other characteristics may be varied to produce a differentiated result.

As the following vessel approaches too closely, it approaches or passes the sleeve 24 and enters the zone 26. The loop which happens to be connected through the switch 42 is now cut by the alternating magnetic field of the zone 26, and a current of the character controlled by the key 31 energizes the transformer 43. This current is heard in the receiver 56 as before and indicates that the vessel has approached too close to the next vessel ahead. Orders are therefore issued to reduce speed until the original sound is heard indicating that the following vessel is between the sleeve 24 and 22.

This mode of operation is followed throughout the train of vessels, and thus a variable course and a predetermined spacing may be held to by an indeterminate number of movable bodies, even in fog or darkness.

When radio frequency current is employed at the transmitter the operation of the system is similar to that described above for audio-frequency signaling, except the receiving vacuum tube 44 is caused to function as a detector instead of amplifier by a readjustment of say battery 54. If the radio signals be sent by manipulation of keys 30 and 31 then the hereinbefore mentioned heterodyne receiver should be placed in operation by the starting of the variable frequency source 39. This is not necessary, if modulated radio frequency current is employed, although it is desirable if the beat note can be adjusted to and maintained at zero frequency. For producing distinguishing characteristics for each of two radiations from cable 20, a tuning fork may be made to vibrate in front of each microphone, 30 and 31, the pitches of said tuning forks being widely different.

Messages can be sent from a leading ship to a trailing ship, either by voice or the telegraphic code by employing the system herein described.

Having thus described my invention, what I claim and desire to secure by Letters Patent is:—

1. In a signalling system, a plurality of ships in predetermined formation, a plurality of variously characterized means for emitting radiant energy from each of the ships except the last, and means responsive to said radiant energy positioned on each ship except the first.

2. In a signalling system, a plurality of ships in predetermined formation, means for transmitting radiant energy from each of the ships except the last, comprising a plurality of variously characterized antennæ, means responsive to radiant energy positioned on each ship except the first.

3. In a signalling system for a train of movable bodies, means trailed by each of said bodies except the last adapted to emit radiant energy, indicating means positioned on each of said bodies except the first selectively responsive to said energy including means for determining the relative intensities of said energy received from different directions to indicate divergence of the course of the respective body from that of the adjacent preceding body and means positioned on each of such bodies excepting the last for emitting radiant energy having impressed thereon modulations for indicating approximately the distance separating the respective body from the preceding adjacent body.

4. In a signalling system for a train of movable bodies, means trailed by each of said bodies except the last for emitting a plurality of series of radiations having different characteristics respectively, indicating means positioned on each of said bodies except the first selectively responsive to said radiant energy including means for differentiating one from another of said series and means for determining the relative intensities of said energy received from diverging directions to indicate divergence of the course of the respective body from that of the adjacent preceding body.

5. A method of ship control which consists in the step of trailing a floating cable behind the ship for indicating the ship's position, to following ships and emitting radiant energy from a portion of said cable for indicating danger in the zone adjacent said portion.

6. In a system of communication between ships, means carried behind the leading ship for transmitting signals to a following ship comprising a floating cable, and means including a portion of said cable for emitting a danger signal to the following ship in the zone adjacent said portion.

7. In a signalling system for a train of movable bodies, means trailed by each of said bodies except the last for emitting a plurality of series of electromagnetic oscillations having different characteristics respectively, and means positioned on each of said bodies except the first for receiving said oscillatory energy including means responsive to one of said series for determining the relative intensities of said energy received from different directions to indicate divergence of the course of the respective body from that of the adjacent preceding body, and including means differently responsive to another of said series according to the distance separating the respective body from the preceding adjacent body.

8. In a signalling system, a plurality of movable bodies in predetermined formation, a source of radio frequency oscillations of predetermined high frequency, a plurality of variously characterized means for emitting radiant frequency oscillations from each of said ships except the last, a corresponding plurality of variously characterized modulators for modulating said predetermined high frequency, additional means for operatively connecting each of said modulators to one of said emitting means, and means responsive to said radiant energy positioned on each ship except the first.

9. In a system for signalling from a movable body, a cable towed by the body, means for impressing signal energy upon the medium surrounding the body comprising having a conductor extending the full length of the cable and a second conductor extending less than the length of the cable, and means for modifying the energy in accordance with a signal.

10. In a system for signalling from a movable body, means for impressing signal energy upon the medium surrounding the body comprising a cable towed by the body having a conductor extending the full length of the cable and a second conductor grounded at a point intermediate the ends of the cable, and means for modifying the energy in accordance with a signal.

11. In a system for signalling from a movable body, means for emitting radiant energy therefrom comprising a pair of spaced members towed at different distances from said body, and means for modifying said energy to produce a signal.

12. In a signalling system for movable bodies, a guiding vessel, a guided vessel, an insulated conductor of predetermined length grounded at its outer extremity towed by the guiding vessel, a second insulated conductor of relatively greater length grounded at its outer extremity towed by the guiding vessel, means for impressing one character of energy upon one of said conductors, additional means for impressing differently characterized energy upon the other of said conductors, and a receiving device positioned upon the guided vessel and responsive to energy emitted from said conductors.

13. In a signalling system, the combination of a plurality of movable bodies in predetermined formation, an insulated conductor of predetermined length grounded at its outer extremity, means for producing energy of predetermined characteristic, a second insulated conductor of relatively greater length, grounded at its outer extremity, said conductors being towed by the guiding body, means for producing energy of relatively different characteristic, said energy producing means being connected to said conductors respectively, and a receiving device on the guided body selectively responsive to the energy emitted by said conductors to produce signals.

14. A system of signalling between a guided and a guiding vessel, a plurality of sources having relatively different signal characteristics, a plurality of conductors of relatively different length each grounded at its outer extremity and each connected at its inner extremity to one of said sources of energy for emitting differently characterized radiant energy respectively, said conductors being towed behind the guiding vessel, and a receiving device on the guided vessel selectively responsive to the differently characterized emitted energy.

In testimony whereof I hereunto affix my signature.

JOHN HAYS HAMMOND, Jr.